United States Patent
Kaneko et al.

(10) Patent No.: US 9,250,617 B2
(45) Date of Patent: Feb. 2, 2016

(54) SMOOTHING DEVICE, SMOOTHING SYSTEM, AND COMPUTER PROGRAM PRODUCT

(71) Applicants: Yu Kaneko, Kanagawa-ken (JP); Shigeo Matsuzawa, Tokyo (JP)

(72) Inventors: Yu Kaneko, Kanagawa-ken (JP); Shigeo Matsuzawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 475 days.

(21) Appl. No.: 13/716,707

(22) Filed: Dec. 17, 2012

(65) Prior Publication Data

US 2013/0173066 A1 Jul. 4, 2013

(30) Foreign Application Priority Data

Dec. 28, 2011 (JP) .................................. 2011-288843

(51) Int. Cl.
G05B 13/02 (2006.01)
G05B 15/02 (2006.01)

(52) U.S. Cl.
CPC ................ G05B 13/02 (2013.01); G05B 15/02 (2013.01); G05B 2219/2642 (2013.01)

(58) Field of Classification Search
CPC . G05B 13/02; G05B 15/02; G05B 2219/2642
USPC ........... 700/276, 275, 300, 295, 277, 291, 28, 700/42; 703/13; 706/12
See application file for complete search history.

(56) References Cited

U.S. PATENT DOCUMENTS

| | | | |
|---|---|---|---|
| 6,216,956 B1* | 4/2001 | Ehlers et al. | 236/47 |
| 8,172,154 B1* | 5/2012 | Figley et al. | 236/44 A |
| 8,676,397 B2* | 3/2014 | Longobardi et al. | 700/299 |
| 2003/0009265 A1* | 1/2003 | Edwin | 700/295 |
| 2005/0278047 A1* | 12/2005 | Ahmed | 700/97 |
| 2009/0234511 A1* | 9/2009 | Ouchi et al. | 700/291 |
| 2010/0198420 A1* | 8/2010 | Rettger et al. | 700/291 |
| 2010/0274336 A1* | 10/2010 | Nguyen-Stella et al. | 607/117 |
| 2012/0065783 A1* | 3/2012 | Fadell et al. | 700/276 |
| 2012/0245740 A1* | 9/2012 | Raestik et al. | 700/276 |
| 2012/0253543 A1* | 10/2012 | Laughman et al. | 700/300 |
| 2013/0090770 A1* | 4/2013 | Lee et al. | 700/277 |

FOREIGN PATENT DOCUMENTS

JP 2005-004676 1/2005

OTHER PUBLICATIONS

Sasaki et al, A Load Balancing Algorithm and a Node Deployment for a Cluster System to Handle Workload Changes, Information Processing Society of Japan (IPSJ) SIG Technical Reports, 2006-DSM-41 (5).

* cited by examiner

Primary Examiner — Kidest Bahta
(74) Attorney, Agent, or Firm — Amin, Turocy & Watson, LLP

(57) ABSTRACT

According to an embodiment, a smoothing device includes an acquiring unit, a determining unit, and selecting unit. The acquiring unit acquires weather information of a plurality of operation areas. A facility device that performs environmental control according to a control value resulting from operation based on the weather information is installed in each of the operation areas. The determining unit determines whether or not an amount of change in weather exceeds a predetermined first threshold in each of the operation areas. The selecting unit selects at least one first operation area that is an operation area in which the amount of change exceeds the first threshold as a halt area for which the operation of the control value used by the facility device installed in the first operation area is halted when the number of first operation areas exceeds a predetermined second threshold.

8 Claims, 12 Drawing Sheets

FIG.4A

| OPERATION AREA ID | FACILITY ID | WEATHER INFORMATION PROVIDING DEVICE INFORMATION |
|---|---|---|
| | | |
| | | |

FIG.4B

| FACILITY ID | CONTROL METHOD INFORMATION |
|---|---|
| | |
| | |

FIG.4C

| OPERATION AREA ID | NUMBER OF CANCELLATIONS | CANCELLATION RATE | CANCELLATION TIME |
|---|---|---|---|
| | | | |
| | | | |

FIG.8

| OWNER ID | OPERATION AREA ID | NUMBER OF OPERATION CANCELLATIONS | OPERATION CANCELLATION RATE |
|---|---|---|---|
|  |  |  |  |
|  |  |  |  |
|  |  |  |  |

FIG.11

| OPERATION AREA ID | PREVIOUS OPERATION TIME SLOT | WEATHER INFORMATION |
|---|---|---|
| | | |
| | | |
| | | |

SMOOTHING DEVICE, SMOOTHING SYSTEM, AND COMPUTER PROGRAM PRODUCT

CROSS-REFERENCE TO RELATED APPLICATION

This application is based upon and claims the benefit of priority from Japanese Patent Application No. 2011-288843, filed on Dec. 28, 2011; the entire contents of which are incorporated herein by reference.

FIELD

Embodiments disclosed herein relate generally to a smoothing device, a smoothing system, and a computer program product.

BACKGROUND

In recent years, remote energy saving services mainly targeted at buildings are provided. Remote energy saving services are services that provide power supply/demand control such as air conditioning control and lighting control to predetermined areas in buildings or the like through the Internet. Control values used for the power supply/demand control such as air conditioning control and lighting control are calculated by operation executing units of servers or the like and distributed to facility devices installed in the areas.

It is known to equalize the calculation load of the operation by distributing the operation over a plurality of executing devices such as servers. It is also known to attempt to reduce the calculation load by performing the operation of control values used for power supply/demand control according to weather information. Specifically, it is known to attempt to reduce the calculation load by performing the operation when the weather has greatly changed and not performing the operation when the change in the weather is small.

With the relate art, however, it is difficult to smooth the calculation load at a time slot in which the weather changes continuously.

BRIEF DESCRIPTION OF THE DRAWINGS

FIGS. 4A to 4C are tables illustrating data structures of information to be stored in a second storage unit, a third storage unit and a fourth storage unit according to the first embodiment;

FIG. 8 is a table of a data structure of information to be stored in a first storage unit according to the second embodiment;

FIG. 11 is a table of a data structure of information to be stored in a fifth storage unit according to the third embodiment.

DETAILED DESCRIPTION

According to an embodiment, a smoothing device includes an acquiring unit, a determining unit, and selecting unit. The acquiring unit acquires weather information of a plurality of operation areas. A facility device that performs environmental control according to a control value resulting from operation based on the weather information is installed in each of the operation areas. The determining unit determines whether or not an amount of change in weather exceeds a predetermined first threshold in each of the operation areas. The selecting unit selects at least one first operation area as a halt area. A halt area is an operation area in which the amount of change exceeds the first threshold. The operation of the control value used by the facility device installed in the first operation area is halted when the number of first operation areas exceeds a predetermined second threshold.

Examples of a smoothing device, a smoothing system and a computer program product therefor according to embodiments will be described in detail below with reference to the accompanying drawings.

First Embodiment

Figure 1:
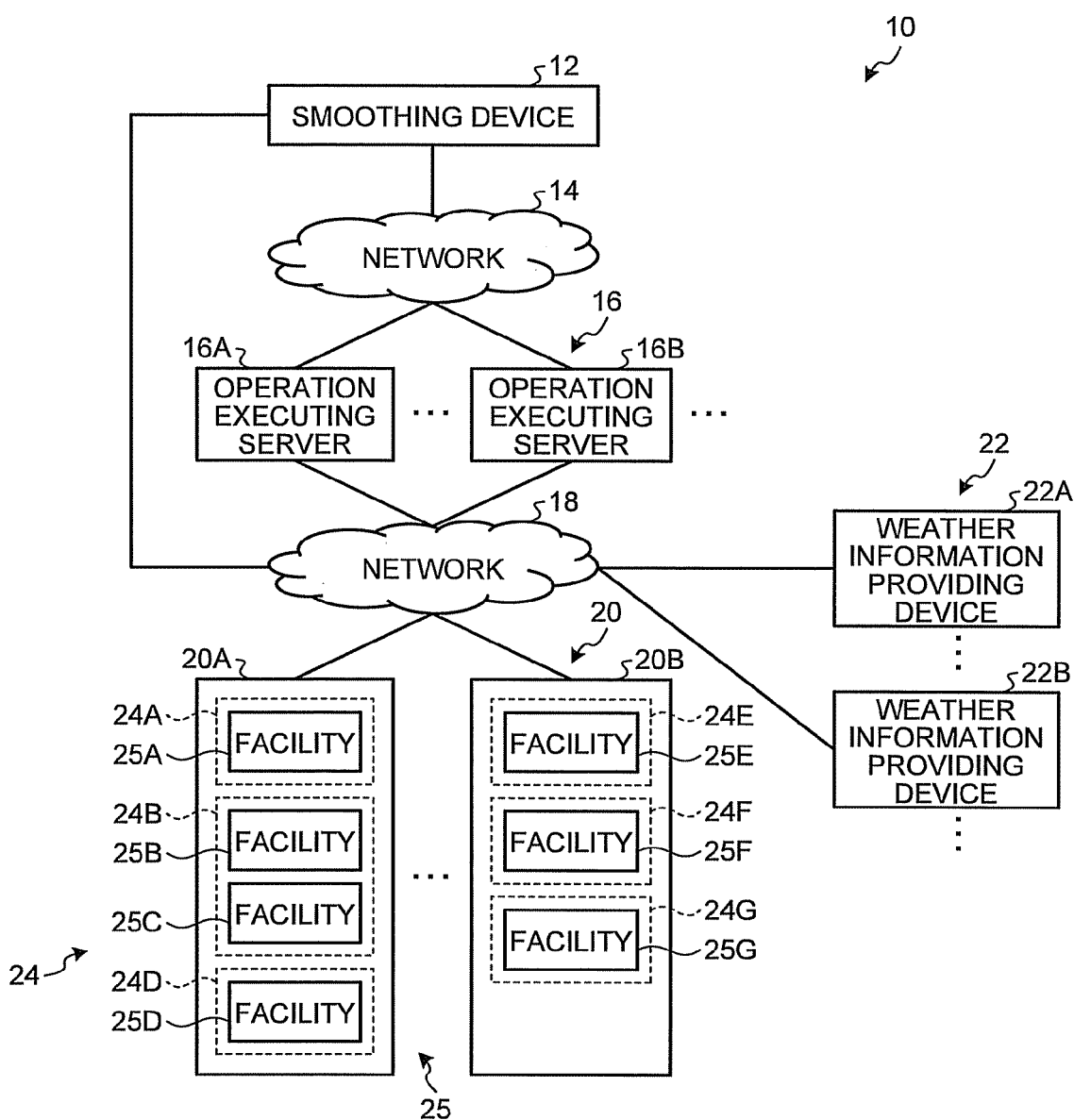
FIG. 1 is a diagram of a smoothing system according to a first embodiment.

FIG. 1 is a block diagram illustrating a configuration of a smoothing system according to the present embodiment.

A smoothing system 10 includes a smoothing device 12, operation executing servers 16, weather information providing devices 22 and facility devices 25. The smoothing device 12 and the operation executing servers 16 are connected via a network 14. The operation executing servers 16 and the facility devices 25 are connected via a network 18. The weather information providing devices 22 and the smoothing device 12 are also connected via the network 18.

The smoothing device 12 is connected with the operation executing servers 16 and the weather information providing devices 22 via the network 14. The operation executing servers 16 are connected with the facility devices 25 via the network 18.

The network 14 and the network 18 are known communication lines. The network 14 and the network 18 may be wired communication networks or wireless communication networks. The network 14 is, for example, a local area network (LAN) and employs communication protocols such as Ethernet (registered trademark) and TCP/IP. The network 18 is, for example, the Internet and employs communication protocols such as Ethernet (registered trademark) and TCP/IP. The network 14 and the network 18 may be one network.

The facility devices 25 perform environmental control on areas in which the facility devices 25 are installed. The environment refers to, but is not limited to, the temperature, the humidity, the illuminance of lighting and the like of each area. Specifically, the facility devices 25 control air conditioning such as the temperature and the humidity, lighting such as the illuminance and the like to control the environment of the areas in which the facility devices 25 are installed. Examples of the facility devices 25 include, but are not limited to, known heating and cooling devices, humidity controlling devices, lighting devices and combinations thereof.

The facility devices 25 include a plurality of facility devices 25A to 25G. These facility devices 25A to 25G will be referred to as the facility devices 25 when the facility devices are described collectively. The facility devices 25 are installed in areas subjected to environmental control in the smoothing system 10. Specifically, the facility devices 25 are installed in respective areas for which the operation executing servers 16 calculate the control values. The control values are values to be used for controlling the facility devices 25. Specifically, the control values are values to be used for control when the facility devices 25 control the environment. The control values are calculated by operation based on weather information executed by the operation executing servers 16 (details of which will be described later). Examples of the control values include temperature information used for temperature control, humidity information used for humidity control and brightness information used for lighting control.

In the present embodiment, the areas in which the facility devices 25 are installed will be referred to as operation areas 24 in the description. The operation areas 24 are areas (spaces) subjected to environmental control in the smoothing system 10. The facility devices 25 are each installed in each of the operation areas 24 into which the area subjected to environmental control in the smoothing system 10 is divided. In the example illustrated in FIG. 1, the facility devices 25 are each installed in each of the areas corresponding to one or more operation areas 24 into which the inside of buildings 20 such as buildings 20A and 20B is divided. In the example illustrated in FIG. 1, one or more facility devices 25 are installed in each of operation areas 24A, 24B, and 24D to 24G. The operation areas 24 are assigned with specific spaces such as conference rooms, corridors and private rooms. The operation areas 24 in which the facility devices 25 are installed, however, are not limited to inside of the buildings 20. The number of facility devices 25 installed in each operation area 24 is not limited to one but a plurality of facility devices 25 may be installed in one operation area 24. The operation areas 24A, 24B, and 24D to 24G will be collectively referred to as the operation areas 24 in the description.

Examples of the buildings 20 include buildings, houses, apartments and factories. While a case in which the operation areas 24 refer to areas in the buildings 20 will be described in the present embodiment, the operation areas 24 are not limited to the buildings 20.

The operation executing servers 16 include a plurality of operation executing servers 16A and 16B. The operation executing servers 16A and 16B will be collectively referred to as the operation executing servers 16. The operation executing servers 16 execute operation to perform energy saving services and calculate control values for the facility devices 25 installed in the operation areas 24. The energy saving services refer to provision of services relating to energy saving to predetermined operation areas 24 via the Internet. Examples of the energy saving services include comfortable air conditioning control and comfortable lighting control. The comfortable air conditioning control is a service that realizes energy saving while maintaining human comfort by determining the preset temperature of air conditioning taking the temperature and the humidity into account. The comfortable lighting control is a service that realizes energy saving while maintaining human comfort by determining the illuminance of lighting taking the solar radiation and the temperature into account.

The operation executing servers 16 receive operation information of each facility device 25 installed in each operation area 24 subjected to operation of the control values from the smoothing device 12. The operation information is information to be used for operation of control values at the operation executing servers 16. The operation information includes weather information (temperature, humidity, wind speed, solar radiation, etc.) at a certain operation time slot (time period) and operation executing time at which each operation is to be executed.

The operation executing servers 16 then execute operation for calculating control values on the basis of the received operation information. The operation executing servers 16 transmit the calculated control values and operation time information indicating the time at which environmental control using the control values is to be performed to the facility devices 25 installed in the operation areas 24 in which the environmental control is to be performed by using the control values.

Upon receipt of the control values, the facility devices 25 control the environment such as the humidity, the temperature and the intensity of lighting by using the received control values.

The weather information providing devices 22 include a plurality of weather information providing devices 22A and 22B. These weather information providing devices 22A and 22B will be collectively referred to as the weather information providing devices 22. The smoothing system 10 only needs to include one weather information providing device 22 and is not limited to a configuration including a plurality of weather information providing devices 22.

The weather information providing devices 22 are devices that provide current weather information of the operation areas 24. The weather information includes the temperature, the humidity, the solar radiation, the wind speed, the wind direction, the amount of rainfall, the amount of snowfall, etc. Examples of the weather information providing devices 22 include known servers that provide known weather information distribution services.

The smoothing device 12 halts the operation of control values for some operation areas 24 at an operation time slot at which the calculation load of the operation of control values (hereinafter may be simply referred to as operation) on the basis of the weather information acquired from the weather information providing devices 22. In this manner, the smoothing device 12 according to the present embodiment smoothes the calculation load of the operation.

Note that the operation of control values for operation areas 24 in which no or a small change in the weather occurs among a plurality of operation areas 24 is halted in order to reduce the calculation load in the related art. The calculation load at a time slot at which the weather frequently changes, however, cannot be reduced by simply halting the operation of the operation areas 24 in which no change in the weather occurs.

Figure 2:
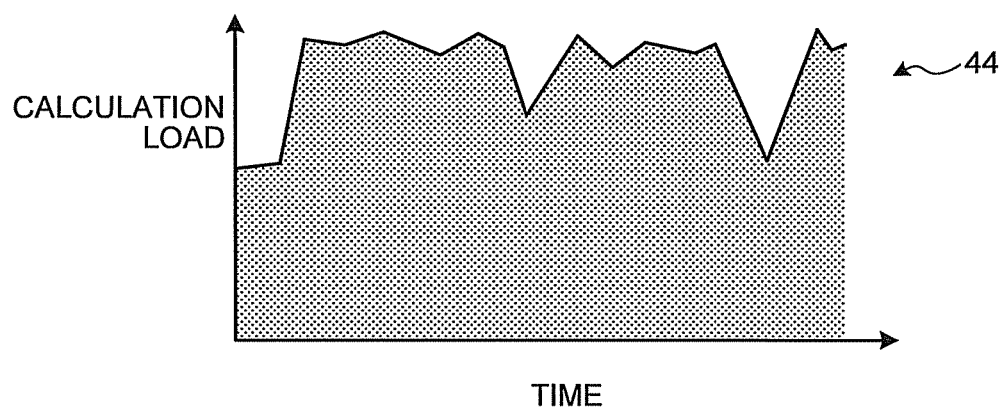
FIG. 2 is a graph illustrating a relation between time and the calculation load in the related art.

FIG. 2 is a graph illustrating a relation between time and the calculation load. As illustrated by a graph 44 in FIG. 2, there occur time slots at which the calculation load is high and time slots at which the calculation load is low when elapsed time is considered. Specifically, the temperature may change by one degree every 10 minutes in the morning in spring and autumn throughout Japan. At a time slot at which the weather greatly changes, since the weather will change in many operation areas 24 for which operation is to be executed, it is difficult to reduce the calculation load. It is thus difficult to smooth changes in the calculation load with time elapsed in the related art.

With the smoothing device 12 according to the present embodiment, therefore, when the number of operation areas 24 (first operation areas) in which the amounts of changes in the weather exceed a predetermined first threshold, among the operation areas 24, exceeds a predetermined second threshold, at least some of the operation area 24 in which the amounts of changes exceed the first threshold are set as halt areas for which operation is halted. In this manner, the changes in the calculation load with time elapsed can be smoothed in the present embodiment.

The smoothing system 10 according to the present embodiment will be described in more detail.

Figure 3:
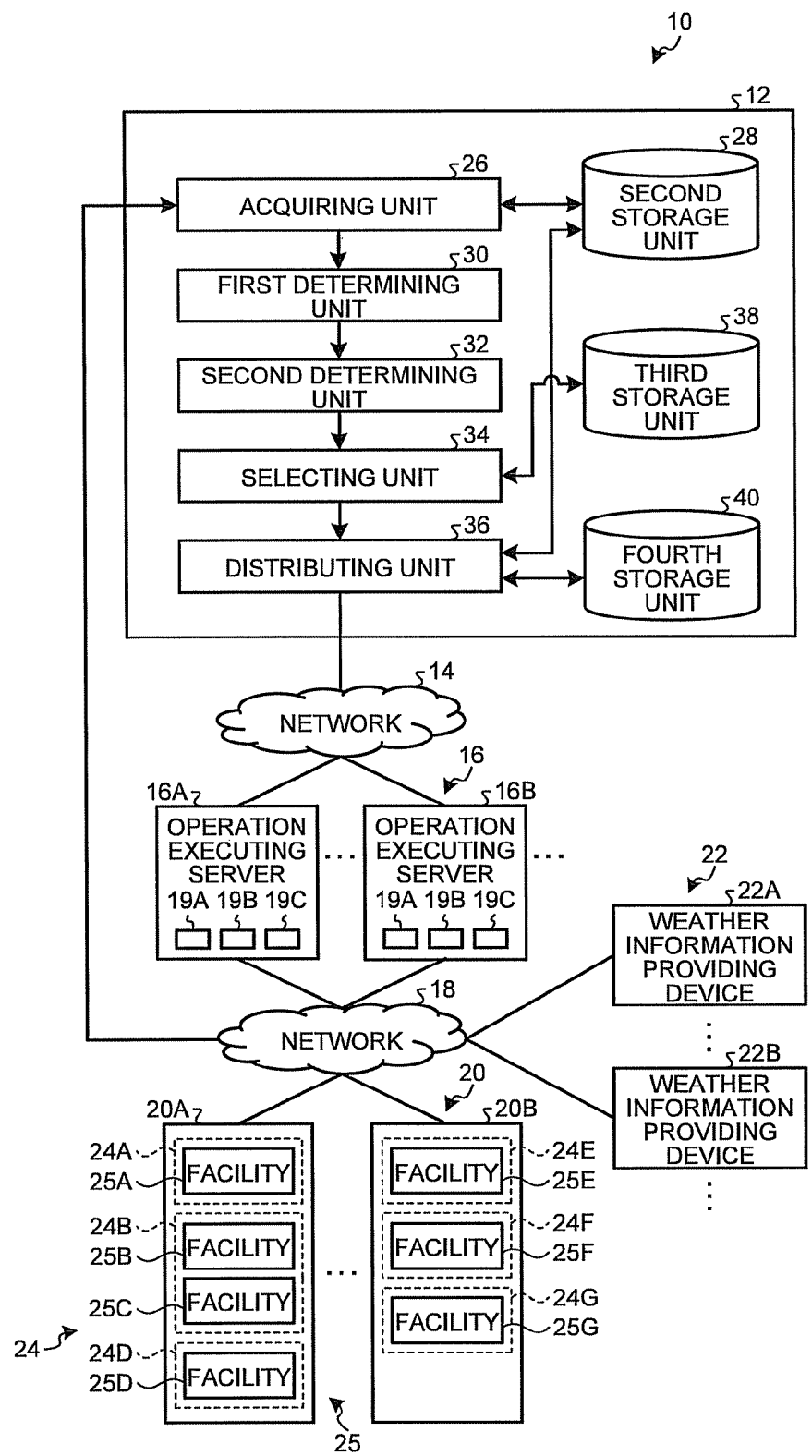
FIG. 3 is a block diagram of the smoothing system according to the first embodiment.

FIG. 3 is a block diagram illustrating the smoothing system 10 in detail. The smoothing device 12 includes an acquiring unit 26, a first determining unit 30, a second determining unit 32, a selecting unit 34, a distributing unit 36, a second storage unit 28, a third storage unit 38 and a fourth storage unit 40.

The acquiring unit 26 acquires weather information of the operation areas 24 from the weather information providing devices 22.

The second storage unit 28 is a storage medium such as a hard disk drive (HDD). The second storage unit 28 stores information indicating all the operation areas 24 subjected to environmental control in the smoothing system 10. FIGS. 4A to 4C are tables illustrating examples of data structures of information stored in the second storage unit 28, the third storage unit 38 and the fourth storage unit 40. FIG. 4A is a table illustrating an example of a data structure of the information indicating the operation areas 24 stored in the second storage unit 28. As illustrated in FIG. 4A, the second storage unit 28 stores an operation area ID, a facility ID and weather information providing device information in association with one another.

The operation area ID is information that uniquely identifies the operation area 24 in which environmental control is to be performed in the smoothing system 10. The facility ID is information that uniquely identifies a facility device 25 installed in an operation area 24. The weather information providing device information is information relating to the weather information providing device 22. Specific examples of the weather information providing device information include an IP address of a weather information providing device 22, a service port number of the weather information providing device 22, a service URL of the weather information providing device 22 and a message format to be received from the weather information providing device 22.

The acquiring unit 26 acquires weather information of the operation areas 24. Specifically, the acquiring unit 26 reads the information relating to the weather information providing devices 22 and the operation areas ID associated with the respective weather information providing devices 22 stored in the second storage unit 28. The acquiring unit 26 then obtains operation areas 24 indicated by the weather information acquired from the weather information providing devices 22 and outputs the operation areas 24 together with the acquired weather information to the first determining unit 30.

The first determining unit 30 receives current weather information of the operation areas 24 from the weather information providing devices 22. The first determining unit 30 then determines whether or not to execute operation of control values for each operation area 24. More specifically, the first determining unit 30 determines whether or not an amount of change in the weather exceeds the first threshold T1 in an operation area 24. The first determining unit 30 then determines an operation area 24 in which the amount of change in the weather exceeds the first threshold T1 as an operation area 24 (first operation area) for which operation of control values is to be executed. The amount of change in the weather is a difference between a value of the weather when the previous operation of the control values was executed and a value of the current weather. In the following description, a group of operation areas 24 for which the first determining unit 30 determines to execute operation of control values is referred to as an operation executing area.

The second determining unit 32 determines whether or not operation of control values is to be halted (hereinafter may also be referred to as cancelled) in each of the operation areas 24 in the operation executing area group determined by the first determining unit 30. The second determining unit 32 determines that operation is to be cancelled when the total number of operation areas 24 in the operation executing area group determined by the first determining unit 30 exceeds a predetermined second threshold T2. While a case in which the number of operation areas 24 is used as the second threshold T2 in the present embodiment, the second threshold T2 is not limited to the number of operation areas 24. For example, the second threshold T2 may be a ratio of the number of operation areas 24 in the operation executing area group to the number of all the operation areas 24.

The selecting unit 34 selects the operation areas 24 (halt areas) for which operation is to be cancelled from the operation executing area group determined by the first determining unit 30 when it is determined by the second determining unit 32 to cancel operation. More specifically, the selecting unit 34 refers to information stored in the third storage unit 38 to select operation areas 24 for which operation is to be cancelled so that the cancellation rates (halt rates) of the operation areas 24 become equal. Details of a method for selecting the operation areas 24 for which operation is to be cancelled will be described later.

The third storage unit 38 stores information indicating a cancellation history of cancellations of operation. The third storage unit 38 is a storage medium such as a hard disk drive (HDD). FIG. 4C is a table illustrating an example of a data structure of the information stored in the third storage unit 38. As illustrated in FIG. 4C, the third storage unit 38 stores the operation area ID, the number of cancellations, the cancellation rate and the cancellation time in association with one another.

The fourth storage unit 40 is a storage medium such as a hard disk drive (HDD). The fourth storage unit 40 stores information on the facility devices 25 at which the calculated control values are to be set. FIG. 4B illustrates an example of a data structure of the information on the facility devices 25 stored in the fourth storage unit 40. As illustrated in FIG. 4B, the fourth storage unit 40 stores a facility ID and control method information in association with one another.

The control method information is information indicating a control method for the facility device 25 identified by the facility ID. Examples of the information indicating a control method for the facility device 25 include an IP address of the facility device 25, an IP address assigned to each building 20 in which the facility device 25 is installed, a service port number of the facility device 25, and a message format of the facility device 25.

The description refers back to FIG. 3 in which the distributing unit 36 distributes the operation information to the operation executing servers 16. The operation information contains information on the operation executing area group resulting from excluding the operation areas 24 for which operation is cancelled selected by the selecting unit 34 from the operation executing area group determined by the first determining unit 30, information on the facility devices 25 installed in the operation areas 24 in the operation executing area group, and the weather information of the operation areas 24 acquired by the acquiring unit 26. A known method may be used for the distribution method of the distributing unit 36. Examples of the distribution method for the distributing unit 36 include a method of distributing the operation information evenly to a plurality of operation executing servers, a method of weighting the operation executing servers 16 according to conditions thereof (such as the CPU usage, the memory consumption, and the network traffic) before distribution, a method of randomly sloping the operation executing servers 16 before distribution, and a method of weighting taking specifications of the operation executing servers 16 into consideration before distribution.

Each operation executing server 16 includes a receiving unit 19A, a calculating unit 19B and an output unit 19C.

The receiving unit 19A receives the operation information containing the weather information of the operation areas 24 acquired by the acquiring unit 26 from the smoothing device 12. The calculating unit 19B executes operation on the basis of the weather information contained in the received operation information to calculate control values to be used at the facility devices 25 installed in the operation areas 24 subjected to environmental control.

The output unit 19C transmits the calculated control values to associated facility devices 25.

Figure 5:
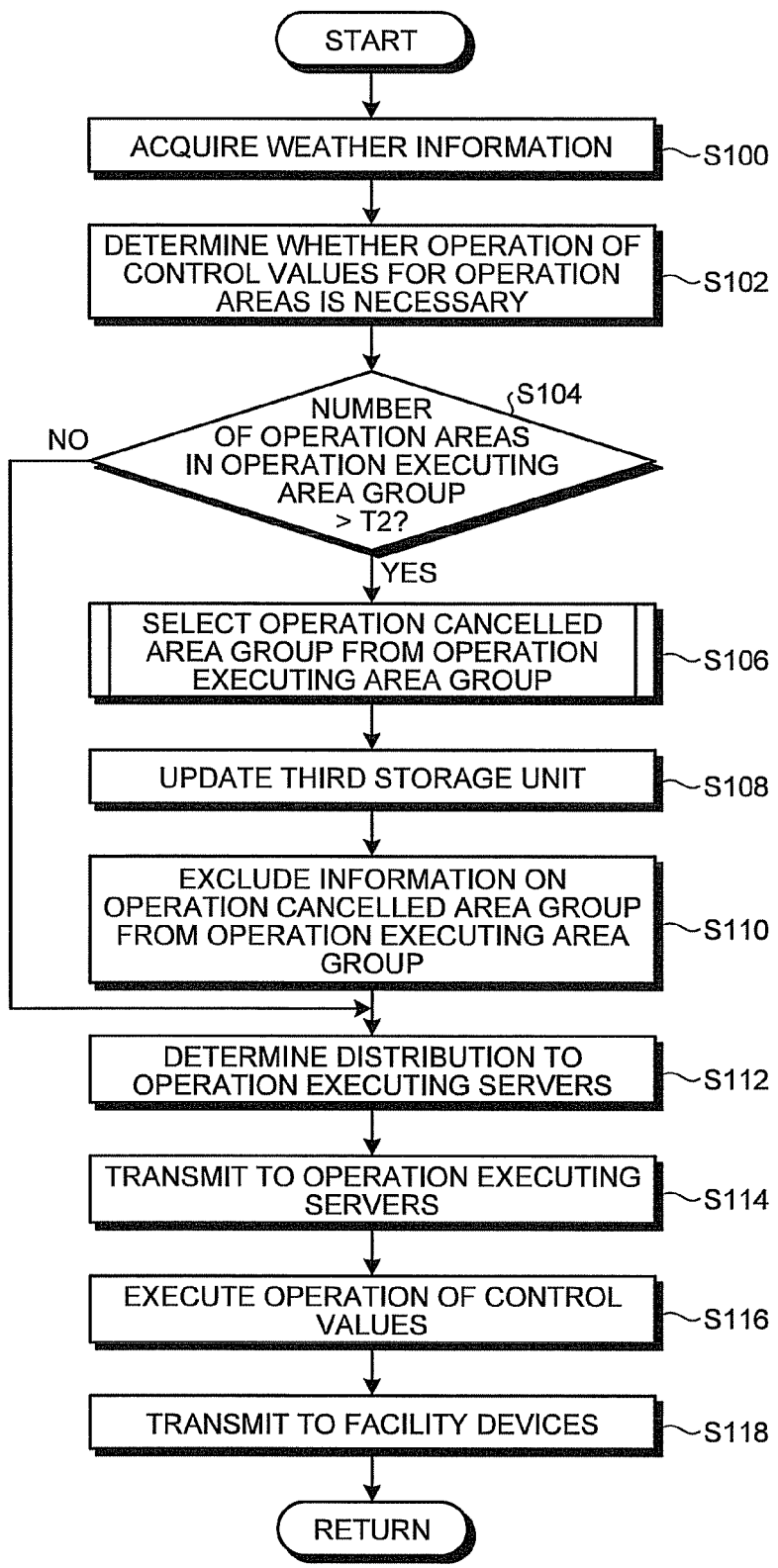
FIG. 5 is a flowchart illustrating procedures of a smoothing process according to the first embodiment.

Next, a smoothing process performed by the smoothing system 10 according to the present embodiment will be described. FIG. 5 is a flowchart illustrating procedures of the smoothing process according to the present embodiment.

In the smoothing system 10, the smoothing process illustrated in FIG. 5 is repeated at predetermined intervals. While a case in which the smoothing process is repeated at 10-minute intervals will be described in the present invention, the repetition is not limited to 10-minute intervals.

First, the acquiring unit 26 acquires weather information of the operation areas 24 from the weather information providing devices 22 (step S100). More specifically, the acquiring unit 26 refers to the second storage unit 28 to obtain weather information providing device information on the weather information providing device 22 that provide the weather information of the operation areas 24. The acquiring unit 26 then acquires the weather information of the operation areas 24 from the respective weather information providing devices 22 identified by the weather information providing device information. The acquiring unit 26 then outputs the acquired weather information of the operation areas 24 to the first determining unit 30.

Next, the first determining unit 30 determines whether or not operation of control values is necessary for each of the operation areas 24 for which the weather information is acquired in step S100 (step S102). In step S102, the first determining unit 30 determines operation areas 24 in which the amounts of changes in the weather exceed the first threshold T1 as an operation executing area group of operation areas 24 for which operation of control values is necessary on the basis of the acquired weather information of the operation areas 24. The first determining unit 30 then outputs the determination result to the second determining unit 32.

Next, the second determining unit 32 determines whether or not the total number of operation areas 24 in the operation executing area group received from the first determining unit 30 exceeds the second threshold T2 (step S104). If the determination in step S104 is negative (No in step S104), the process proceeds to step S112 which will be described later. If the determination in step S104 is positive (Yes in step S104), on the other hand, the process proceeds to step S106.

In step S106, the selecting unit 34 performs a selection process of selecting operation areas 24 (halt areas) (hereinafter may also be referred to as an operation cancelled area group) for which operation of control values is to be cancelled from the operation executing area group (details of which will be described later). In this manner, the halt areas for which operation is halted are selected.

For example, it is assumed that the total number of operation areas 24 in the operation executing area group is N (N is an integer of 1 or larger). In this case, the selecting unit 34 selects operation areas 24, the number of which corresponding to a value (N−T2) obtained by subtracting the second threshold T2 from N, as the operation cancelled area group in the process of step S106.

Next, the selecting unit 34 updates the third storage unit 38 by storing information indicating the selected operation areas 24 represented by the operation cancelled area group in the third storage unit 38 (step S108).

Next, the selecting unit 34 transmits information indicating the operation areas 24 remaining as a result of excluding the operation cancelled area group selected in step S106 from the operation executing area group determined by the first determining unit 30 to the distributing unit 36 (step S110).

Next, the distributing unit 36 determines the method for distribution of the information indicating the operation areas 24 received from the selecting unit 34 and the information on the facility devices 25 associated with the operation areas 24 over the operation executing servers 16, and transmits the information to the determined operation executing servers 16 (steps S112 and S114).

The operation executing servers 16 that have received the information indicating the operation areas 24 and the information on the facility devices 25 associated with the operation areas 24 executes the operation to calculate the control values (step S116). The operation executing servers 16 then transmit the calculated control values to the associated facility devices 25 (step S118) and the present routine is terminated.

Next, the selection process performed in step S106 described above will be described.

Figure 6:
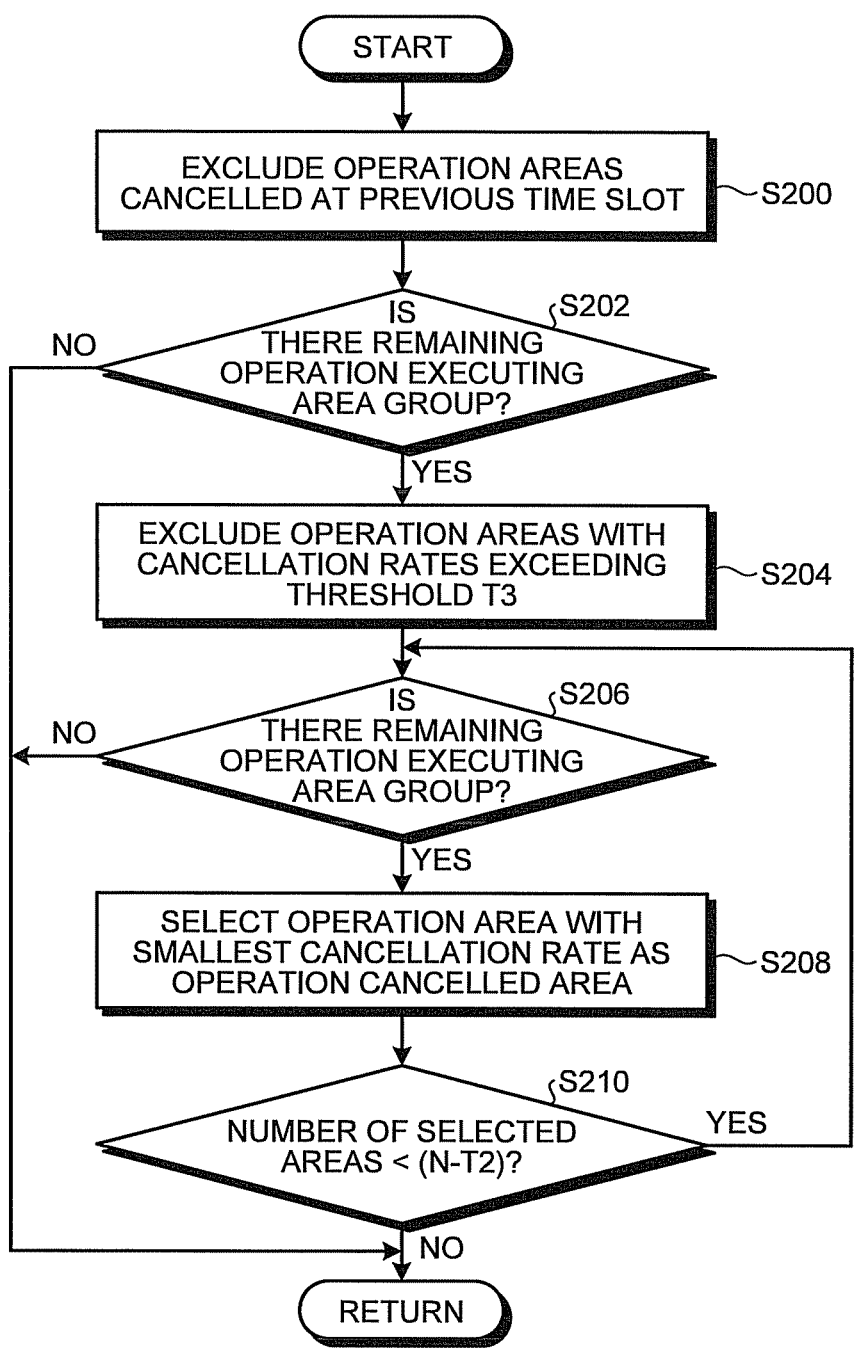
FIG. 6 is a flowchart illustrating procedures of a selection process according to the first embodiment.

FIG. 6 is a flowchart illustrating procedures of the selection process in step S106 described above. As illustrated in FIG. 6, the selecting unit 34 excludes information on the operation areas 24 for which operation was cancelled at a previous operation time slot from the operation executing area group (step S200). The selecting unit 34 performs this process by obtaining the operation areas 24 for which operation was cancelled at the previous operation time slot on the basis of the history information stored in the third storage unit 38.

As a result of the process in step S200, halting of operation for the same operation areas 24 two successive times is prevented. As a result, the comfort and the energy saving effect in a particular operation area 24 is prevented from being greatly reduced.

Next, the selecting unit 34 determines whether or not an operation area 24 specified as the operation executing area group remains after the process in step S200 (step S202). If the determination in step S202 is negative (No in step S202), the present routine is terminated. If the determination in step S202 is positive (Yes in step S202), on the other hand, the process proceeds to step S204.

In step S204, the selecting unit 34 excludes operation areas 24 with the cancellation rates exceeding a third threshold T3 as a result of being selected as operation cancelled areas this time from the operation executing area group remaining as a result of the process in step S200 (step S204). As a result of the process in step S204, a minimum rate of executing operation of control values can be guaranteed for each operation area 24 subjected to operation in the smoothing system 10.

Next, the selecting unit 34 determines whether or not an operation area 24 specified as the operation executing area group still remains after the process in step S204 (step S206). If the determination in step S206 is negative (No in step S206), the present routine is terminated. If the determination in step S206 is positive (Yes in step S206), on the other hand, the process proceeds to step S208.

In step S208, the selecting unit 34 reads the cancellation rates of operation areas 24 specified as the operation executing area group on the basis of the third storage unit 38 even after the process in step S204 is performed. The selecting unit 34 then selects an operation area 24 with the smallest cancellation rate among the operation areas 24 specified as the operation executing area group as an operation cancelled area (step S208). The cancellation rate can be obtained by dividing the number of cancellations stored in the third storage unit 38 by the number of operation time slots at which operation of control values is executed.

With the process in step S208, the selecting unit 34 selects operation areas 24 in ascending order of cancellation rate. It is thus possible to control the cancellation rates of the operation areas 24 to be equal. In step S208, the number of cancellations may be used instead of the cancellation rate.

When there is a plurality of operation areas 24 with the same number of cancellations or the same cancellation rate, a method of arbitrarily selecting one operation area 24 from the operation areas 24, a method of selecting operation areas 24 in descending order of complexity of operation of control values, or the like may be used.

Next, the selecting unit 34 determines whether or not the number of operation areas 24 selected in step S208 is smaller than a value (N−T2) obtained by subtracting the threshold T2 from N (step S210). If the determination in step S210 is positive (Yes in step S210), the process returns to step S206. If the determination in step S210 is negative (No in step S210), on the other hand, the present routine is terminated.

As described above, in the smoothing system 10 according to the present embodiment, when the number of operation areas 24 in the operation executing area group in which the amounts of changes in the weather exceed the first threshold T1 exceeds the second threshold T2, at least some operation areas in the operation executing area group are selected as halt areas for which operation is to be halted.

Thus, with the smoothing system 10 according to the present embodiment, a peak of the calculating load can be eliminated by cancelling operation of control values for some operation areas 24 even if the weather changes frequently and the number of operation areas 24 is increased. In addition, it is possible to minimize decrease in the comfort and the energy saving of the operation areas 24 owing to halting of operation since the cancellation rates of cancelling operation of control values for the operation areas 24 are controlled to be equal.

The smoothing system 10 according to the present embodiment can therefore smooth changes in the calculation load of operation and thus effectively smooth the calculation load.

Second Embodiment

In the smoothing system 10 according to the first embodiment, the operation areas 24 for which operation is to be cancelled are selected so that the cancellation rate or the number of cancellations of the operation become even among the operation areas 24.

In a smoothing system 10A according to the present embodiment, however, operation areas 24 for which operation is to be cancelled are selected so that the halt rates of the operation become equal among predetermined classification groups into which the operation areas 24 are classified.

Examples of a category into which the operation areas 24 are classified include owners of buildings 20 in which the operation areas 24 are arranged. In the present embodiment, a case in which the operation areas 24 are classified according to owners of buildings 20 in which the operation areas 24 are arranged will be described. The method for classification is not limited to that according to owners.

Figure 7:
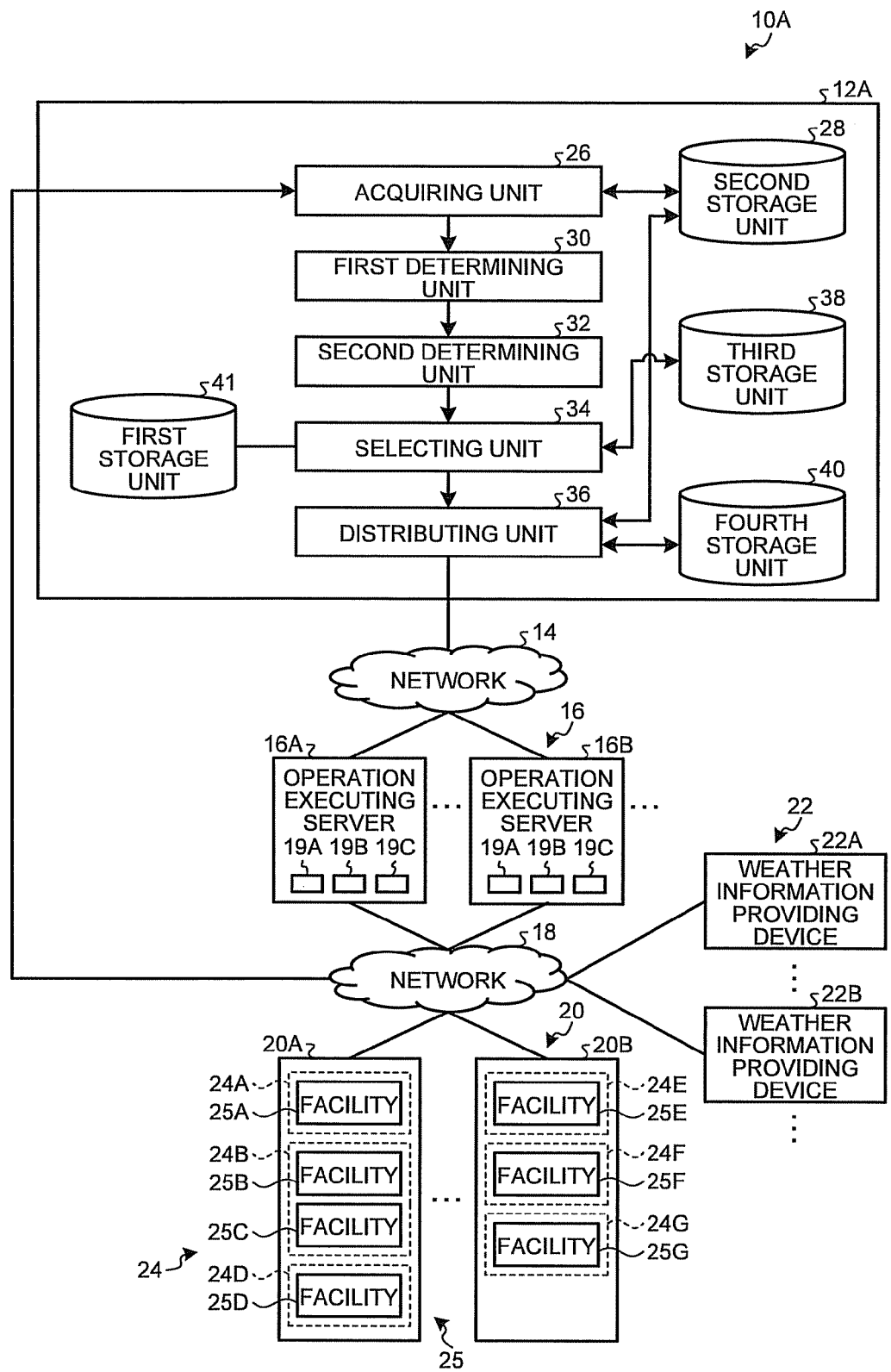
FIG. 7 is a diagram of a smoothing system according to a second embodiment.

FIG. 7 is a block diagram illustrating the smoothing system 10A according to the present embodiment. Functions and components that are the same as those of the smoothing system 10 described in the first embodiment will be designated by the same reference numerals and detailed description thereof will not be repeated. As illustrated in FIG. 7, the smoothing system 10A includes a smoothing device 12A, the operation executing servers 16, the weather information providing devices 22 and the facility devices 25. The smoothing device 12A, the operation executing servers 16, the weather information providing devices 22 and the facility devices 25 are connected via the network 14 or the network 18.

The smoothing device 12A includes the acquiring unit 26, the first determining unit 30, the second determining unit 32, the selecting unit 34, the distributing unit 36, the second storage unit 28, the third storage unit 38 and the fourth storage unit 40 similarly to the smoothing device 12 according to the first embodiment. The smoothing device 12A further includes a first storage unit 41.

The first storage unit 41 is a storage medium such as a hard disk drive (HDD). FIG. 8 is a table illustrating an example of a data structure of the information stored in the first storage unit 41. As illustrated in FIG. 8, the first storage unit 41 stores an owner ID, and operation area ID, the number of cancellation of operation, and an operation cancelling rate in association with one another. The owner ID is information uniquely identifying an owner owing the facility device 25 positioned in each operation area 24.

Figure 9:
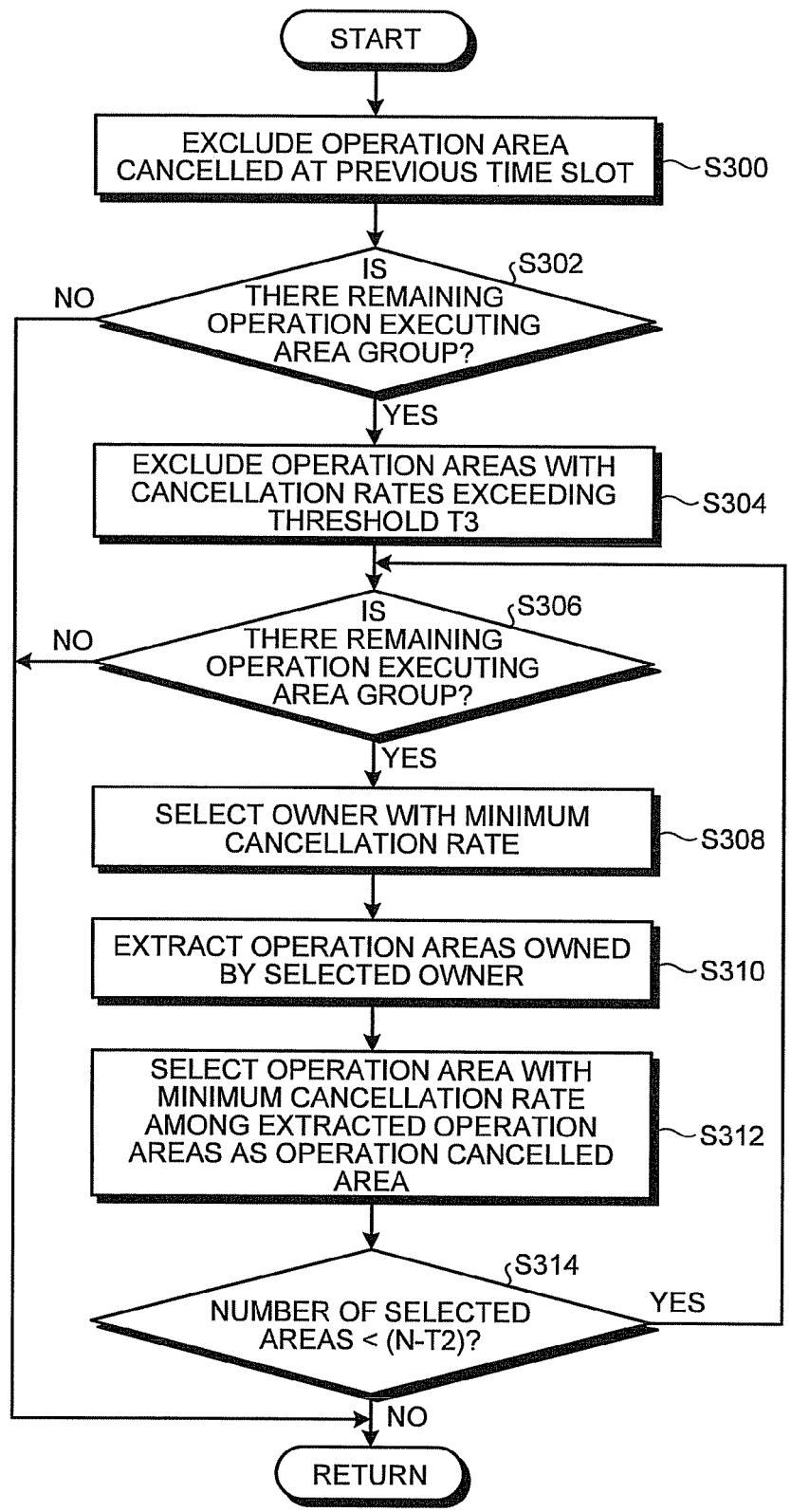
FIG. 9 is a flowchart illustrating procedures of a selection process according to the second embodiment.

The smoothing device 12A according to the present embodiment performs a selection process illustrated in FIG. 9 instead of the selection process performed by the selecting unit 34 in step S106 of the smoothing process (see FIG. 5) performed by the smoothing device 12 according to the first embodiment. FIG. 9 is a flowchart illustrating procedures of the selection process performed by the selecting unit 34 according to the present embodiment.

As illustrated in FIG. 9, the selecting unit 34 excludes information on the operation areas 24 for which operation was cancelled at a previous operation time slot from the operation executing area group similarly to step S200 (step S300).

Next, the selecting unit 34 determines whether or not an operation area 24 specified as the operation executing area group remains after the process in step S300 (step S302). If the determination in step S302 is negative (No in step S302), the present routine is terminated. If the determination in step S302 is positive (Yes in step S302), on the other hand, the process proceeds to step S304.

In step S304, the selecting unit 34 excludes operation areas 24 with the cancellation rates exceeding a third threshold T3 as a result of being selected as operation cancelled areas this time from the operation executing area group remaining as a result of the process in step S300 similarly to step S204 (step S304). Next, the selecting unit 34 determines whether or not an operation area 24 specified as the operation executing area group still remains after the process in step S304 (step S306). If the determination in step S306 is negative (No in step S306), the present routine is terminated. If the determination in step S306 is positive (Yes in step S306), on the other hand, the process proceeds to step S308.

In step S308, the selecting unit 34 reads an owner ID associated with each of the operation areas 24 in the operation executing area group remaining as a result of the process in step S304 from the first storage unit 41. The selecting unit 34 then selects an owner ID associated with a minimum operation cancellation rate among the operation cancellation rates associated with the read owner IDs (step S308).

The operation area 24 owned by the owner identified by the owner ID selected in the process of step S308 is the operation area 24 in which operation is cancelled least frequently.

Next, the selecting unit 34 reads the operation area ID owned by the owner with the owner ID selected in step S308 from the first storage unit 41 and extracts the operation area 24 identified by the read operation area ID (step S310).

The selecting unit 34 then selects the operation area 24 with the smallest value of the operation cancellation rate among the operation areas 24 extracted in step S310 as the operation cancelled area (step S312). In step S312, the selecting unit 34 may select an operation area 24 with the smallest number of cancellations instead of the cancellation rate as the operation cancelled area.

Next, the selecting unit 34 determines whether or not the number of operation areas 24 selected in step S312 is smaller than a value (N−T2) obtained by subtracting the threshold T2 from N (step S314). If the determination in step S314 is positive (Yes in step S314), the process returns to step S306. If the determination in step S314 is negative (No in step S314), on the other hand, the present routine is terminated.

As described above, with the smoothing system 10A according to the present embodiment, the cancellation rates can be kept equal by taking the cancellation history of each owner into account in addition to the cancellation history of each operation area 24 in selecting the operation cancelled area.

When the selection process is performed by the smoothing system 10A according to the present embodiment, if the differences in the numbers of the operation areas 24 owned by owners are large, the cancellation rate of operation areas 24 owned by an owner owning more operation areas 24 may become higher.

In the smoothing system 10A according to the present embodiment, the discount rate of service charges imposed on the owners is therefore set higher as the cancellation rate is higher. This can compensate for the inequality in the cancellation rate among owners. For example, the service charge may be discounted by 10% when the cancellation rate exceeds 10%.

Third Embodiment

In the embodiments described above, the operation cancelled area is selected considering the number of cancellations and the cancellation rate of operation areas 24 for which operation has been cancelled in the past. In the present embodiment, the operation areas 24 with no increase in the energy consumption are selected first in selecting the operation cancelled area.

Note that cancellation of operation of control values when the temperature becomes lower in the summer time may lead to an increase in the energy consumption in the operation areas 24 in which operation is cancelled. This is because the facility devices 25 could have increased the preset temperature of air conditioning in response to lowering of the temperature and reduced the energy consumption if the operation of control values was performed, for example. Similarly, cancellation of operation of control values when the temperature becomes higher in the winter time may lead to an increase in the energy consumption in the operation areas 24.

In the present embodiment, therefore, the operation areas 24 with no increase in the energy consumption are selected first in selecting the operation cancelled area. As a result, it is possible to prevent the energy consumption from increasing owing to cancellation of operation.

Figure 10:
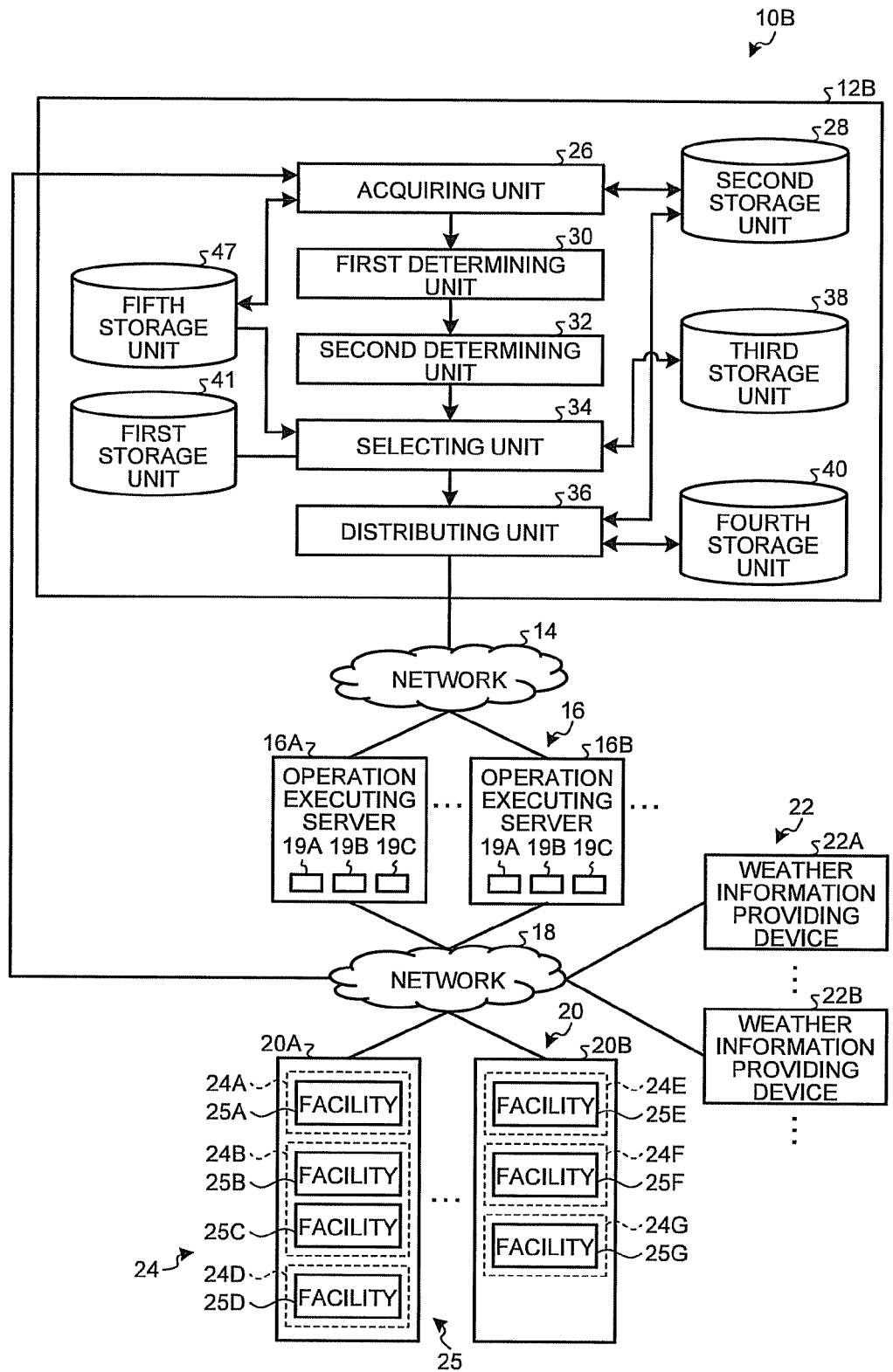
FIG. 10 is a diagram of a smoothing system according to a third embodiment.

FIG. 10 is a block diagram illustrating a smoothing system 10B according to the present embodiment. As illustrated in FIG. 10, the smoothing system 10B according to the present embodiment further includes a fifth storage unit 47 in addition to the configuration of the smoothing system 10A according to the second embodiment.

The fifth storage unit 47 is a storage medium such as a hard disk drive (HDD). FIG. 11 is a table illustrating an example of a data structure of information stored in the fifth storage unit 47. As illustrated in FIG. 11, the fifth storage unit 47 stores an operation area ID, a previous operation time slot, and weather information in association with one another. The weather information represents weather information at a time (previous operation time slot) at which operation was executed in an operation area 24 identified by the associated operation area ID.

Figure 12:
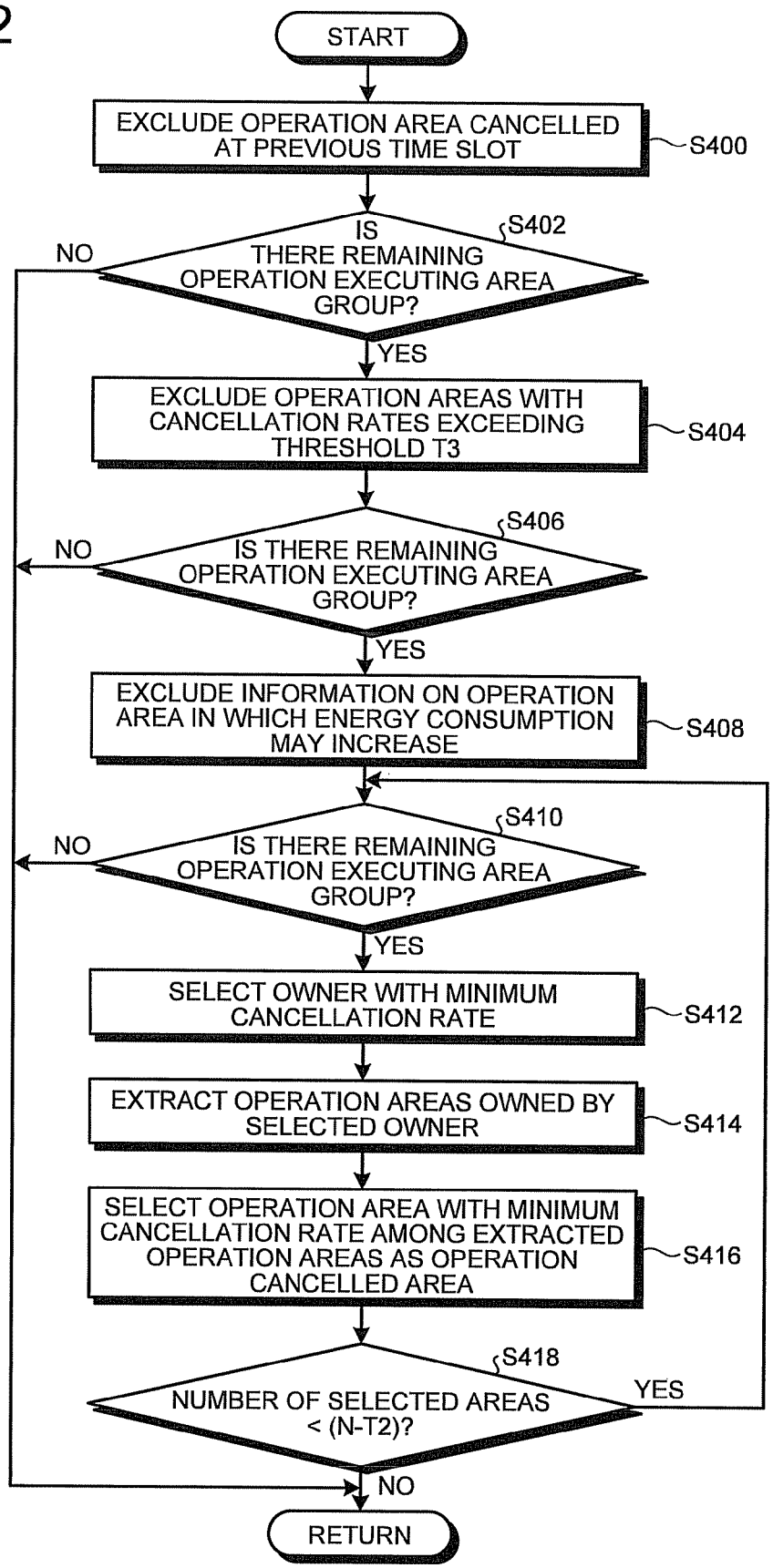
FIG. 12 is a flowchart illustrating a selection process according to the third embodiment.

The smoothing device 12B according to the present embodiment performs a selection process illustrated in FIG. 12 instead of the selection process performed by the selecting unit 34 in step S106 of the smoothing process (see FIG. 5) performed by the smoothing device 12 according to the first embodiment. FIG. 12 is a flowchart illustrating procedures of the selection process performed by the selecting unit 34 according to the present embodiment.

As illustrated in FIG. 12, the selecting unit 34 excludes information on the operation areas 24 for which operation was cancelled at a previous operation time slot from the operation executing area group similarly to step S200 (step S400).

Next, the selecting unit 34 determines whether or not an operation area 24 specified as the operation executing area group remains after the process in step S400 (step S402). If the determination in step S402 is negative (No in step S402), the present routine is terminated. If the determination in step S402 is positive (Yes in step S402), on the other hand, the process proceeds to step S404.

In step S404, the selecting unit 34 excludes operation areas 24 with the cancellation rates exceeding a third threshold T3 as a result of being selected as operation cancelled areas this time from the operation executing area group remaining as a result of the process in step S400 similarly to step S204 (step S404). Next, the selecting unit 34 determines whether or not the operation area 24 specified as the operation executing area group still remains after the process in step S404 (step S406). If the determination in step S406 is negative (No in step S406), the present routine is terminated. If the determination in step S406 is positive (Yes in step S406), on the other hand, the process proceeds to step S408.

In step S408, the selecting unit 34 compares the previous weather information with current weather information of each of the operation areas 24 specified as the operation executing area group remaining as a result of the process in step S404. The previous weather information is obtained by reading the weather information associated with the operation area ID of each operation area 24 from the fifth storage unit 47. Weather information acquired from the weather information providing devices 22 is used as the current weather information. The selecting unit 34 then excludes operation areas 24 in which the energy consumption may increase as a result of cancelling operation of control values from the operation executing area group. Specifically, when the temperature and the humidity are lower than that at a previous time in the summer time or when the temperature is higher than that at a previous time in the winter time, the operation areas are excluded from the operation executing area group since the energy consumption may increase as a result of cancelling operation of control values.

Then, it is determined whether or not there is any operation area 24 remaining as a result of the process in step S408 (step S410). If the determination in step S410 is negative (No in step S410), the present routine is terminated. If the determination in step S410 is positive (Yes in step S410), on the other hand, the process proceeds to step S412.

Next, in step S412, the selecting unit 34 reads an owner ID associated with each of the operation areas 24 in the operation executing area group remaining as a result of the process in step S408 from the first storage unit 41. The selecting unit 34 then selects an owner ID associated with a minimum operation cancellation rate among the operation cancellation rates associated with the read owner IDs (step S412).

The operation area 24 owned by the owner identified by the owner ID selected in the process of step S412 is the operation area 24 in which operation is cancelled least frequently.

Next, the selecting unit 34 reads the operation area ID owned by the owner with the owner ID selected in step S412 from the first storage unit 41 and extracts the operation area 24 identified by the read operation area ID (step S414).

The selecting unit 34 then selects the operation area 24 with the smallest value of the operation cancellation rate among the operation areas 24 extracted in step S414 as the operation cancelled area (step S416). In step S416, the selecting unit 34 may select an operation area 24 with the smallest number of cancellations instead of the cancellation rate as the operation cancelled area.

Next, the selecting unit 34 determines whether or not the number of operation areas 24 selected in step S418 is smaller than a value (N–T2) obtained by subtracting the threshold T2 from N (step S418). If the determination in step S418 is positive (Yes in step S418), the process returns to step S410. If the determination in step S418 is negative (No in step S418), on the other hand, the present routine is terminated.

As described above, with the smoothing system 10B according to the present embodiment, an increase in the energy consumption due to cancellation of operation can be suppressed by taking the influence of cancellation on the energy consumption in the operation areas 24 into account in addition to the cancellation history in selecting the operation cancelled area.

Programs for performing each of the smoothing processes to be executed by the smoothing device 12, the smoothing device 12A and the smoothing device 12B according to the first to third embodiments are embedded in a ROM or the like in advance and provided therefrom.

Alternatively, the programs for performing each of the smoothing processes to be executed by the smoothing device 12, the smoothing device 12A and the smoothing device 12B according to the first to third embodiments may be recorded on a computer readable recording medium such as a CD-ROM, a flexible disk (FD), a CD-R and a digital versatile disk (DVD) in a form of a file that can be installed or executed, and provided therefrom.

Still alternatively, the programs for performing each of the smoothing processes to be executed by the smoothing device 12, the smoothing device 12A and the smoothing device 12B according to the first to third embodiments may be stored on a computer system connected to a network such as the Internet, and provided by being downloaded via the network. Still alternatively, the programs for performing each of the smoothing processes to be executed by the smoothing device 12, the smoothing device 12A and the smoothing device 12B according to the first to third embodiments may be provided or distributed through a network such as the Internet.

The programs for performing each of the smoothing processes to be executed by the smoothing device 12, the smoothing device 12A and the smoothing device 12B according to the first to third embodiments have modular structures including the respective units described above. In an actual hardware configuration, a CPU (processor) reads the programs from the ROM mentioned above and executes the programs, whereby the respective units are loaded on a main storage device and generated thereon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A smoothing device comprising:
an acquiring unit configured to acquire weather information of a plurality of operation areas, a facility device that performs environmental control according to a control value resulting from operation based on the weather information being installed in each of the operation areas;
a determining unit configured to determine whether or not an amount of change in weather exceeds a predetermined first threshold in each of the operation areas; and
a selecting unit configured to select at least one first operation area that is an operation area in which the amount of change exceeds the first threshold as a halt area for which the operation of the control value used by the facility device installed in the first operation area is halted when the number of first operation areas exceeds a predetermined second threshold, wherein
the selecting unit selects the halt area on the basis of a cancellation history of cancellations of the operation such that halt rates of halting operation become equal among the operation areas.

2. The device according to claim 1, further comprising a distributing unit configured to distribute the weather information to be used for operation of control value each used by the facility device installed in each of operation executing areas resulting from excluding the halt area from the operation areas to executing devices that execute the operation.

3. The device according to claim 1, further comprising a first storage unit configured to store in advance identification information for identifying each of the operation areas and classification information of classification of the operation areas into predetermined categories in association with one another, wherein
the selecting unit selects the halt area so that halt rates of halting operation become equal among the categories.

4. The device according to claim 1, wherein the selecting unit selects as the halt area the first operation area different from the operation area previously selected as the halt area among the first operation areas.

5. The device according to claim 1, wherein the selecting unit selects at least one of the first operation areas as the halt area in ascending order of a halt rate of halting the operation among the first operation areas.

6. The device according to claim 1, wherein the selecting unit selects at least one of the first operation areas as the halt area in ascending order of power consumption of the facility device installed therein among the first operation areas.

7. A computer program product comprising a non-transitory computer-readable medium containing a smoothing program executed by a computer, the program causing the computer to execute:
    acquiring weather information of a plurality of operation areas, a facility device that performs environmental control according to a control value resulting from operation based on the weather information being installed in each of the operation areas;
    determining whether or not an amount of change in weather exceeds a predetermined first threshold in each of the operation areas; and
    selecting at least one first operation area that is an operation area in which the amount of change exceeds the first threshold as a halt area for which the operation of the control value used by the facility device installed in the first operation area is halted when the number of first operation areas exceeds a predetermined second threshold, wherein
    the selecting includes selecting the halt area on the basis of a cancellation history of cancellations of the operation such that halt rates of halting operation become equal among the operation areas.

8. A smoothing system comprising:
    a smoothing device; executing devices connected to the smoothing device; and
    facility devices connected to the executing devices, wherein the smoothing device includes
        an acquiring unit configured to acquire weather information of a plurality of operation areas in which the facility devices that perform environmental control according to control values resulting from operation based on the weather information are installed;
    a determining unit configured to determine whether or not an amount of change in weather exceeds a predetermined first threshold in each of the operation areas;
    a selecting unit configured to select at least one first operation area that is an operation area in which the amount of change exceeds the first threshold as a halt area for which the operation of the control value used by the facility device installed in the first operation area is halted when the number of first operation areas exceeds a predetermined second threshold, wherein the selecting unit selects the halt area on the basis of a cancellation history of cancellations of the operation such that halt rates of halting operation become equal among the operation areas; and
    a distributing unit configured to distribute weather information to be used for operation of the control values used by the facility devices installed in operation executing areas resulting from excluding the halt area from the operation areas to the executing devices that execute the operation,
the executing devices execute the operation on the basis of the weather information and calculate the control values to be used by the facility devices installed in the operation executing areas, and
the facility devices control environment of the operation areas in which the facility devices are installed according to the control values.

\* \* \* \* \*